United States Patent [19]

Taguchi

[11] 4,380,372
[45] Apr. 19, 1983

[54] PHASE TRANSITION MODE LIQUID CRYSTAL DISPLAY DEVICE

[75] Inventor: Masaaki Taguchi, Tokyo, Japan

[73] Assignee: Kabushiki Kaisha Daini Seikosha, Japan

[21] Appl. No.: 179,815

[22] Filed: Aug. 20, 1980

[51] Int. Cl.$^3$ .............................................. G02F 1/13
[52] U.S. Cl. ................................. 350/346; 350/340; 350/341; 350/349
[58] Field of Search ............... 350/346, 338, 340, 330, 350/334, 341, 342, 349, 350 R, 351, 352, 343; 252/299.2, 299.6, 299.7; 428/1

[56] References Cited

U.S. PATENT DOCUMENTS

| | | | |
|---|---|---|---|
| 3,833,287 | 9/1974 | Taylor et al. | 350/349 |
| 3,837,730 | 9/1974 | Hatfield et al. | 350/349 |
| 3,854,793 | 12/1974 | Kahn | 350/340 |
| 3,966,305 | 6/1976 | Young | 350/341 |
| 3,973,388 | 8/1976 | Yoshida et al. | 350/338 X |
| 4,112,157 | 9/1978 | Krueger et al. | 350/340 X |
| 4,114,990 | 9/1978 | Mash et al. | 350/340 X |
| 4,165,922 | 8/1979 | Morrissy | 350/340 X |
| 4,183,628 | 1/1980 | Laesser et al. | 350/338 |
| 4,185,894 | 1/1980 | Hilton et al. | 350/338 |
| 4,278,328 | 7/1981 | Mukoh et al. | 350/346 X |

*Primary Examiner*—John K. Corbin
*Assistant Examiner*—David Lewis
*Attorney, Agent, or Firm*—Robert E. Burns; Emmanuel J. Lobato; Bruce L. Adams

[57] ABSTRACT

A phase transition mode liquid crystal display device has a liquid crystal mixture comprised of a nematic liquid crystal and at least one of a cholesteric liquid crystal and a chiral nematic liquid crystal sandwiched between a pair of substrates. Transparent electrodes are formed on the inner surfaces of the substrates in contact with the liquid crystal mixture to define a set of picture elements. The liquid crystal mixture exhibits, in the absence of an electric field, a pseudo-focal-conic light-scattering state due to a thermooptic effect which defines the display background. A relatively high voltage is applied to the liquid crystal mixture in the regions of selected picture elements to transform the selected picture element regions to a homeotropic light-transmitting state and a relatively low voltage is applied to the liquid crystal mixture in the regions of non-selected picture elements to transform the non-selected picture element regions to a focal-conic light-scattering state. In this manner, the selected picture elements are turned on, and the non-selected picture elements are turned off and exhibit an appearance closely similar to that of the display background thereby enhancing the display of the selected picture elements.

26 Claims, 18 Drawing Figures

PHASE TRANSITION MODE LIQUID CRYSTAL DISPLAY DEVICE

BACKGROUND OF THE INVENTION

The present invention relates to a phase transition mode liquid crystal display device using liquid crystals comprised essentially of a mixture liquid crystals of a nematic liquid crystal and a cholesteric liquid crystal, or of a nematic liquid crystal and a chiral nematic liquid crystal, or of these three liquid crystals (these liquid crystal mixtures will be referred to hereinafter as a nematic-cholesteric mixture liquid crystal.).

A phase transition mode liquid crystal display device using a nematic-cholesteric mixture liquid crystal exhibits a strong brightness and a high contrast because such a device does not need a polarizer which has been necessarily used in the conventional field effect mode nematic liquid crystal display device. The phase transition mode liquid crystal display device using a nematic-cholesteric mixture liquid crystal is classified into a p type and an n type in accordance with the polarity of the dielectric anisotropy of the nematic liquid crystal. FIG. 1 illustrates a light transmitting intensity-applied voltage curve for a phase transition mode liquid crystal display device using the n type nematic-cholesteric mixture liquid crystal. A transparent or weak light-scattering state exists in the initial state where no voltage is applied thereto. However, the transparent state is changed into a focal-conic state in which exhibits a strong characteristic when the voltage is applied thereto, and this strong light scattering state is kept for a long time even after removal of the applied voltage. In order to return to the initial state, the application of a high voltage with a high frequency is required.

The phase transition mode liquid crystal display device using a p type nematic-cholesteric mixture liquid crystal is classified into a horizontal alignment type and a homeotropic alignment type in accordance with the aligning treatment of the substrate. As used in this specification, the horizontal alignment type is defined as having a horizontal surface treatment which makes the long axis of the molecules of the liquid crystal in the vicinity of the surface of the substrate align in the horizontal direction, i.e., more or less parallel to the surface of the substrate, and the homeotropic alignment type is defined as having a homeotropic surface treatment which makes the long axis of the molecules of the liquid crystal in the vicinity of the surface of the substrate align in the vertical direction, i.e., more or less perpendicular to the surface of the substrate.

FIG. 2 illustrates a light transmitting intensity-applied voltage curve for the horizontal alignment type phase transition mode liquid crystal display device. A transparent or weak light-scattering state is presented due to the horizontal aligning treatment of the surface of the substrate when no voltage is applied thereto. However, the transparent state is changed into a focal-conic state which exhibits a strong light-scattering characteristic with an increase of the applied voltage, and continued increase of the applied voltage changes the focal-conic state into the light-transparent and homeotropic nematic state, which returns to the initial state with the decrease of the applied voltage in accordance with the hysteresis curve shown in FIG. 2.

FIG. 3 illustrates a light transmitting intensity-applied voltage curve for the homeotropic alignment type phase transition mode liquid crystal display device using a p type nematic-cholesteric mixture liquid crystal. A transparent state with little cloudiness is presented in the initial state when no voltage is applied thereto. However, the transparent state is changed into the focal-conic state which exhibits a strong light-scattering characteristic with an increase of the applied voltage, and continued increase of the voltage changes the focal-conic state into the light-transparent homeotropic nematic state. As illustrated in FIG. 3, a feature of the homeotropic alignment type phase transition mode liquid crystal display device exists in its hysteresis curve wherein the homeotropic nematic state is returned to the initial state through a light-scattering state as shown by dashed-line curve A when the voltage is suddenly cut off. On the other hand, the homeotropic nematic state transforms to the focal-conic state with a slow decrease of the applied voltage as shown by solid-line curve B. Finally the focal-conic state is maintained in spite of the absence of the applied voltage.

As described above, there are many kinds of phase transition mode liquid crystal display devices, and application research is actively underway in order that these devices can be put to practical use as display devices for computers, electric calculators, wristwatches, etc.

The phase transition mode liquid cristal display device can carry out the following two display operations. One is the display operation wherein a display background (the portion other than the selected picture elements) exhibits a transparent state and the selected picture elements exhibits a light scattering state (this type didplay operation will hereinafter be referred to as a positive display) and the other is the display operation wherein a display background a light-scattering state and the selected picture elements exhibit a transparent state (this type display operation will hereinafter be referred to as a negative display). These displays can be carried out by the application of the alternative voltages between the transparent electrodes on the substrates which are arranged so as to form the desired display pattern.

As compared with the two kinds of the display, the negative display is superior to the positive display in that it exhibits a more attractive display and has easier readability. However, in the conventional negative display, extra means for applying the voltage for keeping the focal-conic state is required in order to maintain the display background in the light-scattering state.

Therefore, the conventional negative display device has the disadvantages of too large a power consumption and complexity of the arrangement of the transparent electrodes.

SUMMARY OF THE INVENTION

An object of the present invention is to provide a negative display type phase transition mode liquid crystal display device which does not require any separate means for applying the voltage to the display portion other than the picture elements and which has a relatively simple electrode pattern.

Another object of the present invention is to provide a mixture of liquid crystals suitable for use in display devices according the present invention.

Another object of the present invention is to provide an aligning treatment for improving the electric characteristics of the display device of the present invention.

Another object of the present invention is to provide an aligning treatment for obtaining a stable and reproducible light-scattering accumulative state due to a thermo-optic effect which is used for a display background of the display device of the present invention.

Another object of the present invention is to provide means for displaying the display device of the present invention in color.

Another object of the present invention is to provide a display cell structure wherein the dependency of the visual angle with respect to readability is negligible.

Another object of the present invention is to provide a mechanical reinforcement means for obtaining a stable light scattering accumulative state due to a thermo-optic effect.

Further objects and features of the present invention will be fully understood upon a reading of the following description.

DETAILED DESCRIPTION OF THE DRAWINGS

DETAILED DESCRIPTION OF THE PREFERRED EMBODIMENTS

The present invention utilizes, in a display background of a phase transition mode liquid crystal display device of a negative display type, the phenomenon that a light-scattering state of the nematic-cholesteric mixture liquid crystal due to a thermo-optic effect is semi-permanently maintained as long as the liquid crystal is not subjected to an external force of large enough magnitude to cause relocation or flowing of the liquid crystal molecules, or as long as an external electric or magnetic field is not applied to the liquid crystal.

One well known thermo-optic effect of a nematic-cholesteric mixture liquid crystal sandwiched between two substrates which have undergone various aligning treatments is that the liquid crystal presents a light-scattering state when the liquid crystal cools from a temperature higher than the melting or clearing temperature to a temperature lower than the melting point.

After various research and experimentation, it has been recognized that the light-scattering state due to the thermo-optic effect is not deteriorated by stress due to temperature varation under a temperature less than the melting temperature, or by a shock or a vibration produced by falling, or by exposure to conditions of light irradiation or a high temperature and high humidity. In the present invention, the light-scattering state exhibited in a semi-stable condition (which will hereinafter be referred to as a pseudo-focal-conic state) is utilized as a display background.

According to the results of various experiments, an accumulation phenomenon of the pseudo-focal-conic state has been observed in many liquid crystal cells subjected to surface aligning treatment other than the rubbing treatment. Normally, at an initial state when the nematic-cholesteric mixture liquid crystal is injected and sealed, the phase transition mode liquid crystal display device presents a transparent state or a weak light-scattering state close to a transparent state caused by the flowing of the liquid crystal material during the injecting operation. Although some difference is produced in accordance with the treatment of the surface of the substrate, a uniform light-scattering state is obtained when the liquid crystal is returned to the liquid crystal phase after heating the liquid crystal at a temperature higher than the clearing temperature for transforming it to the liquid phase.

The light-scattering state obtained as described above loses the accumulating function when an electric field is applied thereto. Therefore, only the display pattern portions to which a voltage is applied undergo a change in a state between a homeotropic state and a focal-conic state, and the background portion is maintained in a pseudo-focal conic state.

The present invention will be described in more detail in conjunction with the attached drawings.

Figure 1:
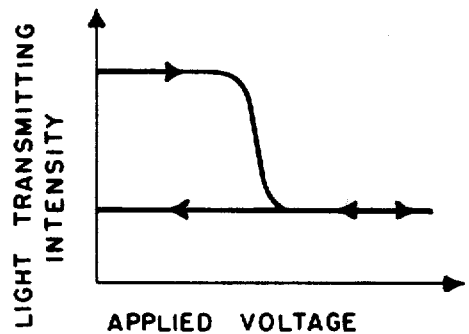
FIG. 1 illustrates a light transmitting intensity-applied voltage curve for a phase transition mode liquid crystal display device using an n type nematic-cholesteric mixture liquid crystal.
Figure 4:
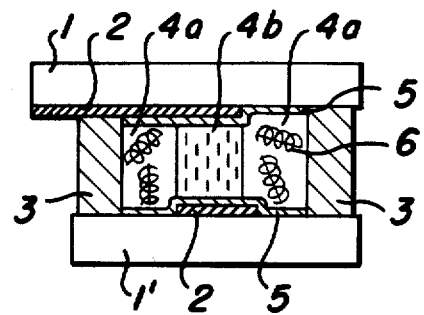
FIG. 4 and FIG. 6 are sectional explanatory views of two embodiments of a phase transition mode liquid crystal display device in accordance with the present invention respectively.
Figure 2:
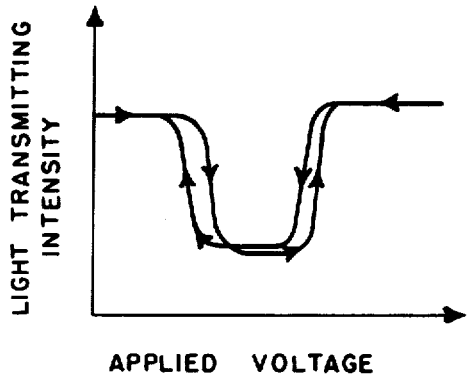
FIG. 2 illustrates a light transmitting intensity-applied voltage curve for a phase transition mode liquid crystal display device wherein a p type nematic-cholesteric mixture liquid crystal is used and which has been formed by a horizontal aligning treatment is made.
Figure 5:
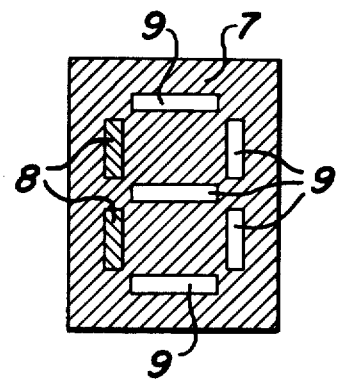
FIG. 5 is a plan view showing one display example by the phase transition mode liquid crystal display device in accordance with the present invention.
Figure 3:
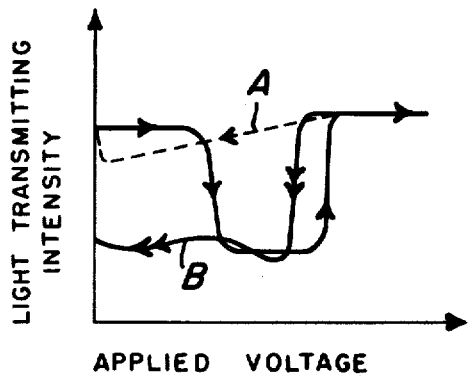
FIG. 3 illustrates a light transmitting intensity-applied voltage curve for a phase transition mode liquid crystal display device wherein a p type nematic-cholesteric mixture liquid crystal is used and which has been formed by a homeotropic aligning treatment.

FIG. 4 illustrates an embodiment of the phase transition mode liquid crystal display device in accordance with the present invention. Reference numerals 1 and 1' are a first and a second glass substrates, respectively. A transparent electrode 2 and an aligning film 5 are formed on the inner surfaces of each of the substrates. Nematic-cholesteric mixture liquid crystals 4a and 4b (although these are the same liquid crystal, to aid in an understanding of the operation, the liquid crystal is divided into the portion 4b sandwiched between the electrodes and another portion 4a) are sandwiched between the substrates by the use of a spacer 3. A helical pattern 6 diagramatically shows that the liquid crystal is in a cholesteric state having a helical structure. In the phase transition mode liquid crystal display device of the present invention, the liquid crystal is heated at a temperature more than the temperature at which the nematic-cholesteric mixture liquid crystal is transformed to a liquid phase (this change-of-phase temperature will be referred to as a clearing temperature) and then the temperature thereof is returned to the normal temperature. By such a heat treatment, the nematic-cholesteric mixture liquid crystals 4a and 4b accumulate the light-scattering state. The pseudo-focal-conic state is thus thermally established in the liquid crystal mixture due to the thermo-optic phenomenon which occurs during formation of the mixture. However, when a voltage is applied, the portion 4b to which the electric field is applied changes its state as shown in FIG. 1, FIG. 2 or FIG. 3 respectively depending upon the kind of liquid crystal and the aligning treatment. At the portion 4a, a pseudo-focal-conic state is maintained which, as shown in FIG. 4, is comprised of a random orientation of the liquid crystal molecules. FIG. 5 illustrates an embodiment in which the present invention is applied to a numerical display device. The portion designated by 7 is in a pseudo-focal-conic state, the portion 8 is in a light-scattering focal-conic state obtained by the application of the voltage, and the portion 9 is in a transparent state of the homeotropic nematic state obtained by the application of a different voltage. by the proper selection of the component of the aligning film or the nematic-cholesteric mixture liquid crystal, the light-scattering states of the portions 7 and 8 can be made to exhibit a similar state in appearance. Each of the portions denoted by reference numerals 8 and 9 is referred to generally as a picture element and in the example shown in FIG. 5, the picture elements 8 are in the "off" state and the picture elements 9 are in the "on" state. In this manner, a negative type display can be obtained in which the display information is depicted by the transparent portions 9 against a background comprised of the light-scattering portions 7 and 8 which exhibit similar appearance.

As described above, a negative type phase transition mode liquid crystal display device can be obtained by easily arranging the electrode pattern similar to that of a TN type liquid crystal display device without any voltage application means at the background portion. Therefore, the power consumption can be reduced as compared to prior art constructions which require that the voltage be applied to the background portion.

It has been confirmed that the accumulation phenomenon of a pseudo-focal-conic state in the phase transition mode liquid crystal display device using a nematic-cholesteric mixture liquid crystal can be obtained in almost all devices subjected to the surface aligning treatment other than the devices subjected to the rubbing treatment. On the other hand, the phenomenon is also observed in the case of the device having two substrates to which no surface aligning treatment is made. However, the portion sandwiched between the surface of the transparent electrode and the surface of the substrate (the display portion) is different in light-scattering intensity than the portion sandwiched between the surfaces of the substrates, (the background portion), and the uniformity of the light-scattering state at the background portion is somewhat below that exhibited at the display portion. However, since the aligning treatment step can be omitted from the fabrication steps of the liquid crystal cell, the manufacturing cost can be significantly reduced.

Although the accumulation phenomenon of the light-scattering state due to the thermo-optic effect is also observed in the phase transition mode liquid crystal display device having two substrates to which aligning treatment is effected by the evaporation of inorganic substances, since the surfaces of the substrates are covered by aligning films formed during the evaporation, the uniformity of the light-scattering state in the background portion is not disturbed and a uniform and beautiful light-scattering state is obtained. Furthermore, light-scattering intensity in the pseudo-focal-conic state produced by an evaporation film of an inorganic substance dependes upon an incident angle of the evaporation. Therefore, it is possible to obtain the pseudo-focal-conic state which exhibits an appearance similar to that of the focal-conic state produced by applying the voltage to the display pattern portion by properly selecting the incident angle of the evaporation. Consequently, a display having an exceedingly uniform and beautiful background is obtained. It has been experimentally confirmed that oxide substances, such as silicon monoxide, silicon dioxide, calcium oxide, tungsten trioxide, titanium oxide, magnesium oxide, fluoride such as magnesium fluoride, calcium fluoride, barium fluoride, and nitride such as boron nitride or the like, can satisfactorily be used for inorganic the evaporation substance. An inactive and nonconductive inorganic substance which is capable of evaporation can be used as an evapolation material for the alignment film of the phase transition mode liquid crystal display device of the present invention.

Moreover, in a phase transition mode liquid crystal display device comprised of two substrates subjected to an aligning treatment by silano organic compounds, the phenomenon of accumulation of the pseudo-focal-conic state has been observed.

With respect to silano organic compounds, it has been confirmed that the accumulation phenomenon of the pseudo-focal-conic state occurs in the following substances:

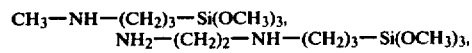

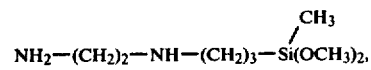

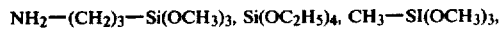

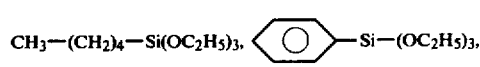

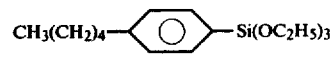

-continued

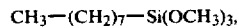
$CH_3-(CH_2)_7-Si(OCH_3)_3$,

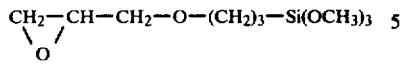

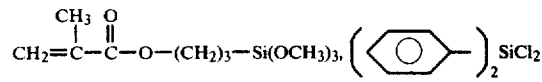

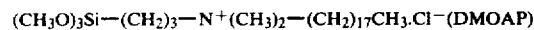
$(CH_3O)_3Si-(CH_2)_3-N^+(CH_3)_2-(CH_2)_{17}CH_3.Cl^-$ (DMOAP)

The aligning treatment using any of these silano organic compounds is carried out by the steps of steeping in a 0.01 to 5.0% by weight aqueous solution, cleaning and drying. These steps are relatively simple. In the aligning treatment using silano organic compounds, any one type of a homeotropic alignment or a horizontal alignment can be performed by properly selecting the kind of silano organic compound. This has the advantage that the increase in the current value with the passage of time is less than that of the aligning treatment performed by an organic compound such as an alkali amine or the like.

In the cell in which silano organic treatment is directly effected on the substrates, since the light-scattering intensity of the portion sandwiched between the surfaces of the transparent electrode and the substrate is slightly different from that of the portion sandwiched between the surfaces of the substrates, the uniformity of the light-scattering state in the background portion is less than that in the display portion. It is necessary that, for obtaining a uniformity of the surface of the substrates, an insulating layer of an inorganic substance be formed on the surface of this substrate and an aligning treatment using a silano organic compound be done over the surface of the insulating layer.

A phase transition mode liquid crystal display device using a p type nematic-cholesteric mixture liquid crystal, is classified into a parallel alignment type, a homeotropic alignment type and a combination alignment type of the parallel alignment and the homeotropic types.

Figure 6:
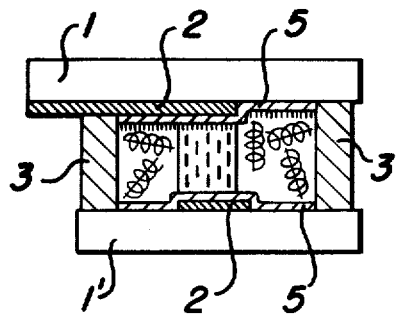
Figure 7:
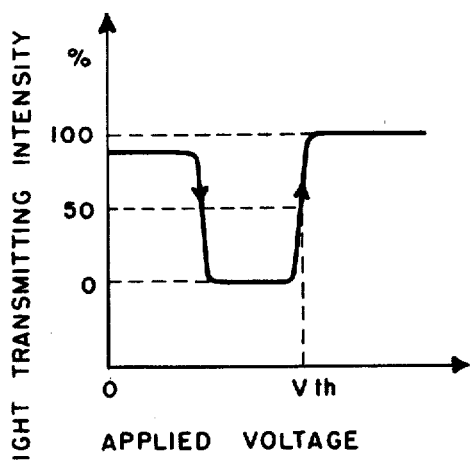
FIG. 7 illustrates an applied voltage—light transmitting intensity curve in a phase transition mode liquid crystal display device using a p type nematic-cholesteric mixture liquid crystal, in which a phase transition voltage Vth is defined.
Figure 8:
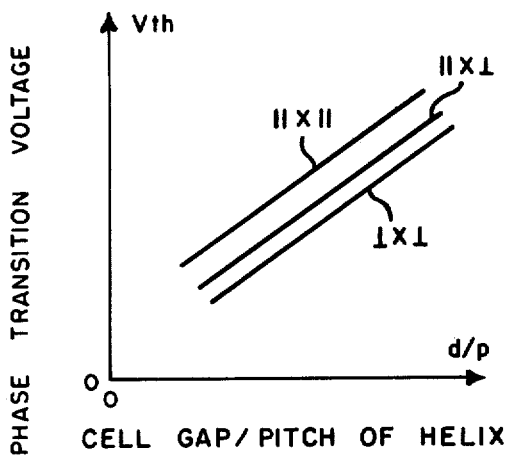
FIG. 8 illustrates curves showing the dependency of the phase transition voltage Vth to the value of a cell gap/pitch of helix.

FIG. 6 illustrates a sectional view of a phase transition mode liquid crystal display device in which a surface of a first substrate is subjected to a homeotropic alignment treatment and a surface of a second substrate is subjected to a horizontal aligning treatment. FIG. 7 illustrates an applied voltage-light transmitting intensity curve for a phase transition mode liquid crystal display device using a p type nematic-cholesteric mixture liquid crystal. When a phase transition voltage Vth is defined as shown FIG. 7, the corresponding curves of the cell gap/pitch-phase transition voltage in a parallel alignment type, a homeotropic alignment type and a combination alignment type display device are as shown in FIG. 8. As understood from FIG. 8, the phase transition voltage Vth of a homeotropic alignment type is the lowest in the phase transition mode liquid crystal display device using p type nematic-cholesteric mixture liquid crystal. However, when the voltage for producing the homeotropic nematic state is changed to the voltage for producing the focal-conic state, the time for completing the phase transition process of a horizontal alignment type is short, and the time for completing the phase transition process of a homeotropic alignment type and a combination alignment type is long. Therefore, lightening and darkening of the display indication in the horizontal alignment type can be carried out only by the voltage changing between the voltage for inducing the homeotropic nematic state and the voltage for inducing the focal-conic state. However, for the other two types, such a method is not sufficient to obtain a high-response speed so that in these two types the method of changing the voltage under the zero volts has been generally employed.

However, it becomes clear that, in the combination alignment type, the phase transition process time from the homeotropic state to the focal-conic state can be shortened to such a degree as the time required for the horizontal alignment type by especially selecting a non-directional and random horizontal alignment as the horizontal alignment and by making the surface uniformly rough. Since a stable pseudo-focal-conic state is obtained by such a combination of alignments, a phase transition mode liquid crystal display cell with lower phase transition voltage Vth as compared with the horizontal alignment type is obtained. As a result, a lower voltage driving is possible as compared with the case of the horizontal alignment type. Also, if the same driving voltage is used, a high response characteristic can be obtained. Such a random horizontal alignment can be performed by the process of effecting the aligning treatment by the use of silano organic compounds having a short side chain on the sputtered film and effecting a thermal treatment at a proper temperature.

In the negative type phase transition mode liquid crystal display device utilizing a pseudo-focal-conic state as the background portion in accordance with the present invention, the contrast of display can be increased by arranging a reflector on the back of the display device, and a display state with exhibiting a good contrast can be obtained by the natural light without need of providing a light source around the display cell. That is, the light-scattering layer of the liquid crystal scatters not only incident light, but also reflected light so that a stronger scattering intensity is obtained.

Generally, a light reflection layer is formed on the outer surface of the second glass substrate by sputtering or metal evaporation of a silver, aluminum or the like. As the light reflection factor for such a metal does not depend upon the wave length of incident light incident, white light is reflected so that the light-scattering layer has a white appearance.

As the negative type phase transition mode liquid crystal display device of the present invention is a light-scattering type which can obtain a light display, a highly ornamental display can be realized if a colored display device is used.

Figure 9:
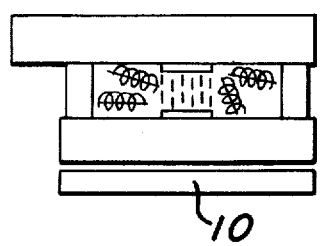
FIG. 9 is a sectional explanatory view of an embodiment of the present invention, wherein a reflector is arranged at the back portion.

Then, for the coloration, a light reflector 10 as shown in FIG. 9 is used instead of the conventional light reflection layer.

The reflection factor of the light reflector depends on the wavelength of the incident light so that light within a predetermined range of wavelengths is particularly powerfully reflected when the incident light is white light. If such a reflector is used, since the strengthened reflection light is greatly scattered by a light irregular reflection layer, the display is colored in accordance with the light within the predetermined range of wavelengths.

Figure 10:
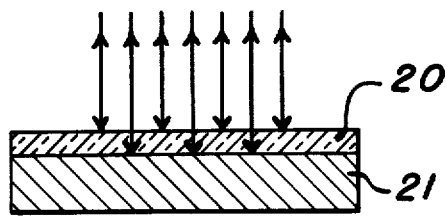
FIG. 10 is a sectional view of a reflector of the present invention.

Such a reflector may be arranged as shown in FIG. 10. In FIG. 10, reference numeral 20 is a transparent evaporated substance the refractive index n of which is not equal to 1, and 21 is a metal plate such as a stainless steel polished in the form of a mirror surface or the like.

A part of the incident light into the reflector having such a structure is reflected on the surface of the evaporated substance, and the other portion thereof is reflected on the mirror surface. The reflected light is strengthened in accordance with the light interference phenomenon when the phases of the two reflected lights are coincident with one another. The condition for coincidence between the phases depends upon the wavelength λ of the incident light, the refractive index n of the evaporated substance, and the thickness d of the evaporated film. Therefore, if the values of n and d are properly determined, the reflection intensity of the light with the desired wavelength λ is strengthened, and a predetermined color tone will be exhibited. Since the reflector having such a structure absorbs a negligible amount of light, the quality of display contrast will not be decreased. According to this technique, the display of various color hues can be obtained by suitably selecting the thickness d of the evaporated film in accordance with the desired display pattern and coloration.

The reflector with a constant color tone can be obtained by employing another structure. That is, instead of the evaporated substance 20 in FIG. 10, a thin film layer having the property that only light with a predetermined wavelength is absorbed and light with other wavelengths is passed through can be used. A transparent resin film to which is added a dye can be used for such a thin film. However, this material is inferior in reflection efficiency compared to the reflector described above.

Moreover, the reflection film with a constant color tone can be formed by the sputtering or the evaporation of a colored metal, such as gold, copper or the like. Furthermore, the reflection film having a pattern divided by or formed of coloration zones can be obtained when metals having different hues from each other are subjected to evaporation or sputtering so as to form two or more layers by the use of a desired mask.

Figure 11:
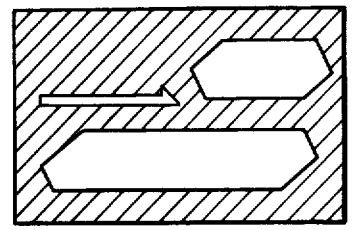
FIG. 11 and FIG. 12 illustrate display patterns divided into different portions by a coloration on the multi-color reflection mirror surface.
Figure 12:
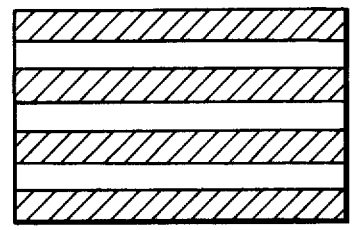

One embodiment of a pattern divided by coloration zones on the reflection surface with more than two kinds of color, which are formed as described above, is illustrated in FIGS. 11 and 12. FIG. 11 is an example of a reflecting mirror surface for a display device used in a timepiece. The ornamental effect is emphasized by the use of different coloration given to the background for the numerals and characters for displaying hour, minute, month, date and so on and the background for another portion. When such a reflection surface is placed on the back portion of the negative type phase transition mode liquid crystal display device, a variable and beautiful display state can be obtained in which the background exhibits some of the pale colors of the reflecting mirror surface. FIG. 12 is another example of a display pattern divided by coloration zones.

The lowering in the brightness due to the use of the colored reflecting mirror surface can be almost prevented by using a reflecting mirror surface colored with a pale color having a high reflection factor.

For obtaining the colored display, in accordance with the invention, a very small amount of dye is added to the nematic-cholesteric mixture liquid crystal material. When a very small amount of dye is added to the nematic-cholesteric mixture liquid crystal, the pseudo-focal-conic state exhibits a light-scattering state uniformly colored with the color of the dye all over the surface. The focal-conic state produced by the application of voltage is also colored with such a color. However, when the state of the nematic-cholesteric mixture liquid crystal is changed from the focal-conic state to the homeotropic state by applying the voltage, the state becomes a light transmitting state colored with the color of the dye. Although the coloration is conspicuous in the light-scattering state even by adding a very small amount of dye, the coloration at the transparent portion is not conspicuous. Therefore, by adding a very small amount of dye, an almost transparent display for numerals, characters or the like can be obtained against the colored light-scattering background state.

Figure 13:
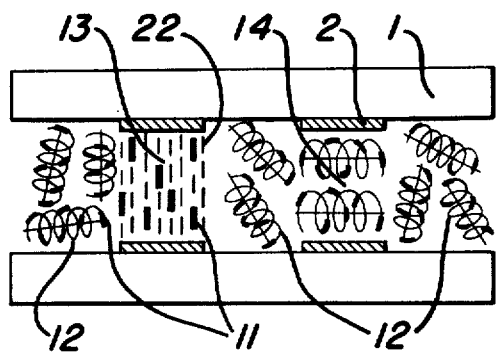
FIG. 13 is a sectional explanatory view of an embodiment of the present invention using a p type nematic-cholesteric liquid crystal to which a dichroic dye is added.

Especially, in the case of the use of a dichroic dye, only the portion of the light-scattering state in the background portion can be colored without the coloration of the display portion in the transparent state by the use of proper combination of the liquid crystal and the alignment. For example, a liquid crystal mixture of p type nematic liquid crystal, cholesteric liquid crystal and a very small amount of dichroic dye uses injected and sealed into a cell which was subjected to treatment by a silano organic aligning agent of short side chain or a homogenous aligning treatment by the oblique evaporation technique using silicone oxide or the like, and after this, heated at a temperature higher than the clearing temperature of the liquid crystal and cooled gradually to form a light-scattering state colored with the color of the dye overall the surface thereof. FIG. 13 is a diagramatical view of the cell when applying the voltage thereto. The spirals depict that the liquid crystal mixture is in the cholesteric state having a rotational axes in the directions of the lines in the center of each of the spirals. The large rods 11 indicate dichroic dye and the small lines 22 indicate that the liquid crystal mixture is in the nematic state. Numeral 12 shows a region in the pseudo-focal-conic state in which the liquid crystal molecules are randomly oriented, 14 shows a region in the focal-conic state formed by the application of the low voltage, and 13 shows a region in the homeotropic state by the application of the high voltage and in which the liquid crystal molecues are oriented with their axes parallel to the substrates. The light-scattering state shown by the regions 12 and 14 are similar in outlook involving the coloration degree by the dichroic dye, and both are used as a background portion at this display moment. Since, in the region 13 which is in the homeotropic state, the dichroic dye is aligned in the direction in which light absorption is weak due to the alignment of the molecules of the liquid crystal, it is not colored. Therefore, numerals, characters or the like in the transparent state are displayed against a background which exhibits a uniform colored light-scattering state.

In this type display device, when the reflector colored with a specified color is located at the back portion and the white light source is placed upward and downward or rightside and leftside of the cell, the light-scattering portion irregularly reflects the light from the light source to present the color of the dye, while the color of the reflector appears through the transparent portion. As a result, a two-color display is carried out. Such a display against a background in a light-scattering state can also be realized by the use of an n type nematic-cholesteric mixture liquid crystal or by the homeotropic alignment for the substrate alignment. The background in a light-scattering state is a feature of such a type display, and this is different from the usual guest-host type display device utilizing the difference between the light absorption intensity due to the dichroic dye. Therefore, it is preferable to add a very small amount of dye to an extent that the brightness of the light scattering of the background is not so decreased, and then the bright light-scattering state with a pale color tone can be obtained.

Many dye materials with an excellent light-resistance and an easy dissolution for liquid crystal, such as dichroic dyes, have been developed and have already put into a practical use for a display element. Therefore, in the present invention, various kinds of color tone involving intermediate colors can be used for a display by selecting and adding the proper dye materials or by adding and combining more than two kinds of dyes.

As described above, due to the easy operation of adding the dye to the liquid crystal, the ornamental value of the negative type phase transition mode liquid crystal display device using the pseudo-focal conic state as a background, can be increased all the more.

Furthermore, the the cell structure of the present invention achieves a widening of the visual angle and an easy reading of the display device.

Figure 14:
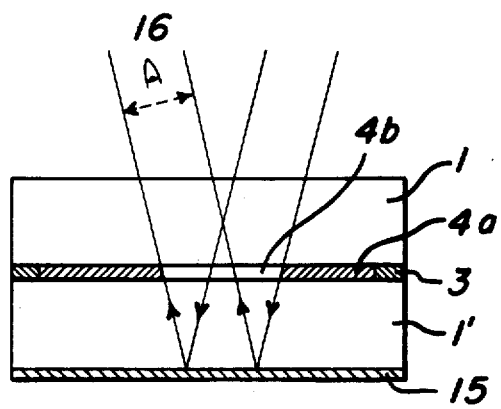
FIG. 14 is a sectional view of an embodiment of a negative type phase transition liquid crystal display device.

FIG. 14 illustrates another embodiment of the present invention.

Figure 15:
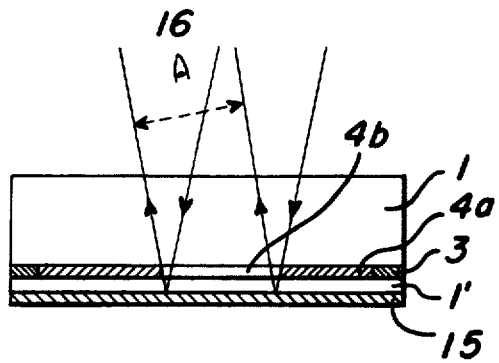
FIG. 15 is a sectional view of an embodiment of a negative type phase transition liquid crystal display device employing a thin back substrate.

In FIG. 14, reference numeral 15 designates a light reflection film provided so as to increase the display contrast. In this case, the observer recognizes the selected picture elements by looking at the mirror surface on an outer surface of a second substrate through a transparent window 4b surrounded by a light-scattering portion 4a. Then, since there is a stepped portion produced by the thickness of the second substrate between the window and the mirror surface, the effective area of the selected picture elements recognized by viewing from the slantwise direction becomes small as compared with the area viewed from the front direction. Therefore, there is a disadvantage of the blurring of the display since the visual angle is small when the thickness of the second substrate is thick. To remove these drawbacks, the thickness of the second substrate should be as small as possible. FIG. 15 is an example wherein the thickness of the second substrate is made small. As clearly understood from the comparison with FIG. 14, the effective area of the selected picture elements recognized by viewing from the slantwise direction becomes larger and the effective area is almost equal to the area viewed from the front direction.

Generally, in the conventional cells having two glass substrates bonded to each other by an adhesive, these two substrates which form the frontside and a backside usually have the same thickness for economical reasons. For making the device thin, if the thickness of the substrates, not only the second substrate but also the first substrate, is made thin, it is extremely effective. However, there is some limit for making the thickness of these glass substrates thin, because, the mechanical strength reduces with the reduction of the thickness, and resultantly, the mechanical strength lessens to such an extent that it can not bear the normal mechanical shocks which are experienced during the assembling of the cell or during use of the device. As shown in FIG. 15, if only the thickness of the second substrate is reduced, the reduction degree of the mechanical strength is relaxed, and then the improvement of the visual angle characteristic which is the desired object can be achieved.

With this structure, the reproducibility and a uniformity of the pseudo-focal-conic state presents problems. Because the pseudo-focal-conic state is produced by cooling the liquid crystal from a temperature higher than the clearing temperature, and at this time, the liquid crystal is moved by thermal distortion due to the cooling when the thickness of the second substrate is less than that of the first substrate thereby making it difficult reproduce a uniform pseudo-focal-conic state. Although a pseudo-focal-conic state is essentially a stable state, it is of such nature that the state is transformed into a grandjean state by the flowing of the liquid crystal. When the flowing occurs during the cooling operation, due to the structure of the cell, a high quality light-scattering state can not be obtained.

Figure 16:
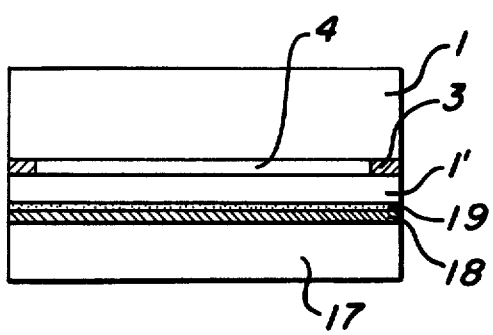
FIG. 16 is a sectional view of an embodiment in which a reinforcement plate is adheres to a back of the second substrate.

This disadvantage can be removed by bonding the reinforcing member on the outer surface of the substrate. FIG. 16 illustrates such an embodiment wherein a reflector 17 coated with a reflecting film layer 18 is bonded by a transparent adhesive 19. As illustrated, it is possible to use the reflector as the reinforcing member.

The invention will now be specifically described referring to various specific embodiments thereof.

EMBODIMENT 1

Tin dioxide was sprayed onto two surface-ground hard-glass substrates to form a transparent electrode film thereon and the transparent electrode film was etched to provide a transparent electrode. The two glass substrates were then subjected to an ultrasonic cleaning using pure water and an alcohol and subjected to steam cleaning and dried. Then, the glass substrates were assembled into a cell using a nylon film as a spacer. A liquid crystal mixture of 94% by weight of biphenyl liquid crystal material E-7 manufactured and sold by Merk and 6% by weight of cholesteryl nonanoate was injected into and sealed in the cell. The so prepared liquid crystal cell was heated to a temperature of 70° C. and then cooled gradually by standing in air to obtain a substantially uniform light-scattering pseudo-focal-conic state all over the surface of the liquid crystal cell. An AC electric field of 9 V was applied to selected display picture elements to provide a homeotropic state and an AC electric field of 3 V was applied to the remaining display picture elements to provide a focal-conic state. Thus, the display of a transparent state against a background of a light-scattering state was obtained. When a reflector with gold evaporated thereon was placed at the back of the cell, a very beautiful display having a golden mirror surface was obtained on a background of a pale yellow light-scattering state.

EMBODIMENT 2

After transparent electrodes had been formed on a first glass substrate of 0.5 mm thick and a second substrate of 0.2 mm thick, silicon monoxide was evaporated onto the surfaces of the respective substrates at an incident angle of 80°. The substrates were then sealed by a spacer to form a cell.

A mixture of 92% by weight of biphenyl liquid crystal material E-7 manufactured and sold by Merk and 8% by weight of P-2-methylbuthyl-P'-cyanobiphenyl was injected into and sealed in the so prepared cell. A reflector on which aluminum had been evaporated was bonded to the bottom surface of the liquid crystal cell using a transparent adhesive. The liquid crystal cell was heated to a temperature of 70° C. and cooled gradually by standing in air, until the whole surface of the liquid crystal cell presented a uniform light-scattering pseudo-focal-conic state. When an A.C. electric field of 12 V and 50 Hz was applied to selected display picture elements to render them transparent and an A.C. electric field of 4 V was applied to nonselected display picture elements to put them in a focal-conic light scattering state, there was obtained a beautiful display of silvery mirror surface against a uniform light-scattering background. The display had a wide visual angle without fuzz in the display when viewed slantwise.

EMBODIMENT 3

After indium oxide had been evaporated onto two glass substrates and transparent electrodes had been formed thereon, the substrates were steeped in a 0.1% by weight solution of $NH_2—(CH_2)_3—Si(OC_2H_5)_3$ and cleaned with pure water and alcohol. The substrates were then calcined at a temperature of 200° C. for one hour and sealed using a spacer to form a cell. A liquid crystal mixture of 94% by weight of biphenyl liquid crystal material E-7 manufactured and sold by Merck, 3% by weight of cholesteryl chloride and 3% by weight of P-2-methylbuthyl-P'-cyanobiphenyl and, as an additive, 0.2% by weight of anthraquinone dyestuff D-77 manufactured and sold by BDH were injected into and sealed in the cell and the cell was heated to a temperature of 70° C. and cooled gradually by standing in air, the whole surface of the liquid crystal cell presented a uniform pale pink light-scattering pseudo-focal-conic state. An A.C. electric field of 9 V was applied to selected display picture elements to render them transparent and an A.C. electric field of 3 V was applied to nonselected display picture elements to put them in a focal-conic light-scattering state. Thus, a transparent indication against a substantially uniform pale pink light-scattering background was obtained. Though the employed liquid crystal cell was of a horizontal alignment type, the cell showed an excellent memory function for the focal-conic state after the voltage had been removed. When a ceramic plate colored with blue was attached to the back of the cell and an intensive white light source disposed on the side of the cell was illuminated, there was obtained a blue indication against a pale pink light-scattering background.

EMBODIMENT 4

A liquid crystal mixture containing 85% by weight of a mixture formed of MBBA and EBBA at a ratio of 3:2 and 15% by weight of cholesteryl nonanoate was injected into and sealed in a cell identical with the cell prepared in Embodiment 3. This liquid crystal cell was heated to a temperature of 80° C. and cooled gradually by standing in air to present a uniform light-scattering pseudo-focal-conic state all over the surface of the liquid crystal cell. An electric field of 120 V and 5 KHz was applied to selected display picture elements to render them transparent and an electric field of 30 V and 100 Hz was applied to nonselected display picture elements to put them in a focal-conic light-scattering state. Thus, a transparent display against a uniform light-scattering background was obtained. When the electric field was removed after the display had been written by the application of the electric field, both the light-scattering state and the transparent state were maintained and the indication was held for a long time. By placing a copper plate having a mirror surface at the back of the liquid crystal cell, there was obtained beautiful copper mirror face indication against a pale coppery light-scattering background.

EMBODIMENT 5

Silicon monoxide coatings of 500 Å thick were formed, by sputtering, on two glass substrates having transparent electrodes provided thereon, respectively. Then, one of the substrates was steeped in a 0.1% by weight aqueous solution of $(Ch_3O)_3—(CH_2)_3—N^+(CH_3)_2—(CH_2)_{17}CH_3.Cl^-$(DMOAP), baked at a temperature of 120° C. for one hour. Another substrate was steeped in a 0.5% by weight aqueous solution of $NH_2(CH_2)—Si(OC_2H_5)_3$, cleaned with pure water and an alcohol and baked at a temperature of 200° C. for one hour. The substrates were assembled into a cell using a nylon film spacer.

A liquid crystal mixture of 94% by weight of biphenyl liquid crystal material E-7 manufactured and sold by Merck and 6% by weight of P-2-methylbutyle-P'-cianobiphenyle was injected into and sealed in the cell. This liquid crystal cell was heated to a temperature of 80° C. and gradually cooled by standing in air to obtain a uniform light-scattering pseudo-focal-conic state all over the surface of the liquid crystal cell. An A.C. electric field of 9 V was applied to selected display picture elements to render them transparent and an A.C. electric field of 3 V was applied to nonselected display picture elements to put them into a forcal-conic light-scattering state. Thus, there was obtained a beautiful transparent display against a background of a uniform light-scattering state.

The display had excellent response characteristic to the voltage change between 3 V and 9 V and exhibited excellent uniformity in the light-scattering state of the background.

EMBODIMENT 6

Figure 17:
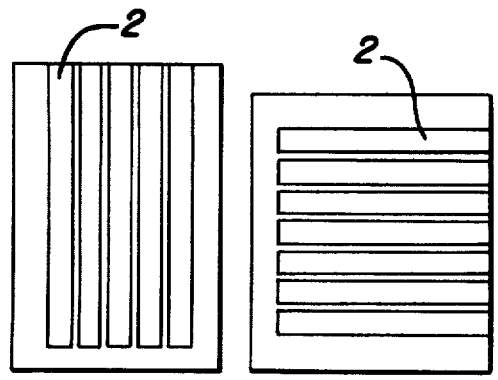
FIG. 17 is a plan view showing an electrode pattern of an example 6.

After transparent electrodes were formed on two glass substrates, respectively, by sputtering indium oxide thereon as illustrated in FIG. 17, the substrates were steeped in a 0.1% by weight aqueous solution of $(CH_3O)_3—Si—(CH_2)_3—N^+(CH_3)_2—(Ch_2)_{17}CH_3.Cl^-$(DMOAP), subjected to cleaning with pure water and an alcohol and baked at a temperature of 120° C. for one hour. The so treated substrates were then assembled into a cell, sealing them by a spacer.

Figure 18:
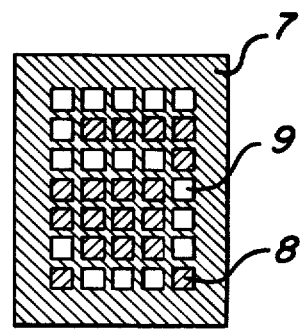
FIG. 18 is a plan view showing one display example of the example 6.

A liquid crystal mixture of 90% by weight of biphenyl liquid crystal material E-7 manufactured and sold by Merck and 10% by weight of cholesteryl nonanoate was injected into and sealed in the cell. The so formed liquid crystal cell was heated to a temperature of 70° C. and cooled gradually by standing in air to obtain a uniform light-scattering pseudo-focal-conic state all over the surface of the liquid crystal cell. This liquid crystal cell showed aa homeotropic alignment type behavior and allowed line-sequential scanning. When selected display picture elements were made transparent and nonselected display picture elements were put into a focal-conic light-scattering state by making line-sequential scanning at a suitable voltage, there was obtained a transparent negative type display against a background of a uniform light-scattering state as illustrated in FIG. 18.

Negative display by dot-matrix can also be obtained by a phase transition mode liquid crystal display device using a conventional homeotropic alignment type p type nematic-cholesteric liquid crystal mixture having no thermo-optic effect, but, in the device, the portions between the strip-electrodes where a voltage is not applied remain transparent so that there can not be obtained a uniform light-scattering background. Furthermore, to obtain a negative letter of 5×7 dots as illustrated in FIG. 18, additional electrodes must be provided at the periphery and therefore 7×9 dots are required. Thus, the present invention has a great advantage when it is applied to a dot-matrix indication.

EMBODIMENT 7

Magnesium fluoride was evaporated onto one of two substrates having electrodes formed thereon, at an incident angle of 80° with the substrate. Another substrate was steeped in a 0.2% by weight aqueous solution of a silane compound, e.g., $CH_3-(CH_2)_4-Si(OCH_3)_3$, cleaned with pure water and an alcohol and baked at a temperature of 200° C. for one hour. The two substrates were sealed using a spacer to form a cell. A liquid crystal mixture of 93% by weight of shiff liquid crystal material RO-200 manufactured and sold by Hoffmann-La Roche Co., Ltd. and 7% by weight of cholesteryl oleate was injected into and sealed in the cell. The so formed liquid crystal cell was heated to a temperature of 80° C. and cooled gradually by standing in air to obtain a uniform light-scattering pseudo-focal-conic state all over the liquid crystal cell surface. An A.C. electric field of 11 V was applied to selected display picture elements to render them transparent and an A.C. electric field was applied to nonselected display pixture elements to put them into a focal-conic light-scattering state. Thus, there was obtained a transparent display against a background of a uniform light-scattering state. By placing various reflectors having various colored mirror surfaces, respectively, at the back of the cell, very beautiful displays of various colors were obtained.

As described above, according to the present invention, by the same simple electrode structure as that of the TN-FE type liquid crystal display device, a beautiful negative type display against the background of a uniform light-scattering state becomes possible. A color display is also possible by properly selecting a reflector or adding dye, and when used as the display device of an electric calculator or an electronic wristwatch, an extremly fashionable display can be obtained. As described above, the present invention is able to remarkably improve the appearance of the phase transition mode liquid crystal display device and offers great advantages for promoting the popularization of the phase transition mode liquid crystal display device.

What is claimed is:

1. A phase transition mode liquid crystal display device comprising: a liquid crystal mixture comprised of a nematic liquid crystal and at least one of a cholesteric liquid crystal and a chiral nematic liquid crystal, the liquid crystal mixture exhibiting in the absence of an electric field a pseudo-focal-conic light-scattering state due to a thermo-optic effect to define the display background; means including a set of picture elements coacting with the liquid crystal mixture for selectively applying electric fields to the liquid crystal mixture to display selected picture elements, said means comprising means for applying a relatively high voltage to the liquid crystal mixture in the regions of selected picture elements to transform the selected picture element regions to a homeotropic light-transmitting state and for applying a relatively low voltage to the liquid crystal mixture in the regions of non-selected picture elements to transform the non-selected picture element regions to a focal-conic light-scattering state; and wherein the appearance of the non-selected picture elements is closely similar to that of the display background thereby enhancing the display of the selected picture elements.

2. A phase transition mode liquid crystal display device as claimed in claim 1; including two substrates sandwiching the liquid crystal mixture therebetween, the two substrates being free of any aligning treatment.

3. A phase transition mode liquid crystal display device as claimed in claim 1; including two substrates sandwiching the liquid crystal mixture therebetween, at least one of the two substrates being subjected to an aligning treatment.

4. A phase transition mode liquid crystal display device as claimed in claim 3; wherein said aligning treatment is carried out by the evaporation of an inorganic substance.

5. A phase transition mode liquid crystal display device as claimed in claim 3; wherein said aligning treatment is carried out by a silano organic compound.

6. A phase transition mode liquid crystal display device as claimed in claim 5; further including an insulating film of an inorganic substance formed on the surface of the two substrates.

7. A phase transition mode liquid crystal display device as claimed in claim 1; including two substrates sandwiching the liquid crystal mixture therebetween, one of the two substrates being subjected to a homeotropic aligning treatment and the other of the two substrates being subjected to a horizontal aligning treatment.

8. A phase transition mode liquid crystal display device as claimed in claim 1; including a light reflector effective to strongly reflect incident light of a particular wavelength mounted at a back portion of the display device.

9. A phase transition mode liquid crystal display device as claimed in claim 1; wherein the liquid crystal mixture contains a dye.

10. A phase transition mode liquid crystal display device as claimed in claim 1; including front and back substrates sandwiching the liquid crystal mixture therebetween, the thickness of the back substrate being less than that of the front substrate.

11. A phase transition mode liquid crystal display device as claimed in claim 1; including front and back substrates sandwiching the liquid crystal therebetween; and a reinforcing plate bonded on the outer surface of the back substrate.

12. A phase transition mode liquid crystal display device as claimed in claim 1; wherein the liquid crystal mixture of the display background comprises randomly oriented molecules which define the pseudo-focal-conic state.

13. A phase transition mode liquid crystal display device as claimed in claim 12; wherein the randomly oriented molecules are in a permanent randomly oriented state.

14. A phase transition mode liquid crystal display device as claimed in claim 1; wherein the liquid crystal mixture comprises a liquid crystal mixture which has been heated above its clearing temperature and then gradually cooled to impart thereto the pseudo-focal-conic state.

15. A phase transition mode liquid crystal display device comprising: a liquid crystal mixture comprised of a nematic liquid crystal mixed with at least one of a cholesteric liquid crystal and a chiral nematic liquid crystal, the liquid crystal mixture having a thermally established psuedo-focal-conic state in which the liquid crystal mixture exhibits in the absence of an electric field a light-scattering characteristic effective for use as the display background; and means including electrodes arranged to define a pattern of picture elements against the display background and coacting with the liquid crystal mixture for selectively applying electric fields to the liquid crystal mixture to display selected picture elements, said means comprising means for applying a relatively strong electric field to the liquid crystal mixture in the regions of selected picture elements to transform the selected picture element regions to a homeotropic light-transmitting state and for applying a relatively weak electric field to the liquid crystal mixture in the regions of non-selected picture elements to transform the non-selected picture element regions to a focal-conic light-scattering state; whereby the light-scattering states of the display background and the non-selected picture element regions exhibit a generally similar appearance which contrasts with that of the light-transmitting state of the selected picture element regions.

16. A phase transition mode liquid crystal display device according to claim 15; wherein the liquid crystal mixture of the display background comprises randomly oriented molecules which define the psuedo-focal-conic state.

17. A phase transition mode liquid crystal display device according to claim 16; wherein the randomly oriented molecules are in a permanent randomly oriented state.

18. A phase transition mode liquid crystal display device according to claim 15; wherein the liquid crystal mixture comprises a liquid crystal mixture which has been heated above its clearing temperature and then gradually cooled to impart thereto the pseudo-focal-conic state.

19. A phase transition mode liquid crystal display device according to claim 15; including a pair of substrates sandwiching therebetween the liquid crystal mixture, the electrodes being formed on the surfaces of the substrates.

20. In a phase transition mode liquid crystal display device of the type having a pattern of picture elements displayed against a display background, the improvement wherein the display background comprises a liquid crystal mixture composed of a nematic liquid crystal mixed with at least one of a cholesteric liquid crystal and a chiral nematic liquid crystal, the liquid crystal mixture exhibiting a stable pseudo-focal-conic state characterized by a random orientation of the liquid crystal mixture molecules which imparts a light-scattering characteristic to the liquid crystal mixture of the display background.

21. A phase transition mode liquid crystal display device according to claim 20; wherein the liquid crystal mixture exhibits the pseudo-focal-conic state due to a thermo-optic effect.

22. A phase transition mode liquid crystal display device according to claim 20; wherein the liquid crystal mixture comprises a liquid crystal mixture having a thermally established pseudo-focal-conic state.

23. A phase transition mode liquid crystal display device according to claim 20; wherein the liquid crystal mixture comprises a liquid crystal mixture which has been heated above its clearing temperature and then gradually cooled to impart thereto the pseudo-focal-conic state.

24. A method of producing a display background for use in a phase transition mode liquid crystal display device, comprising the steps of:
providing a liquid crystal mixture comprised of a nematic liquid crystal mixed with at least one of a cholesteric liquid crystal and a chiral nematic liquid crystal;
sealing the liquid crystal mixture between a pair of substrates to form a cell;
heating the cell to a temperature above the clearing temperature of the liquid crystal mixture; and
cooling the heated cell to transform the liquid crystal mixture into a stable pseudo-focal-conic light-scattering state effective for use as a display background in a phase transition mode liquid crystal display device.

25. A method according to claim 24; wherein the cooling step comprises gradually cooling the heated cell by standing the same in the ambient air.

26. A method according to claim 24; wherein the heating step comprises heating the cell to a temperature on the order of about 70°–80° C.

* * * * *